(12) United States Patent
Takahashi (10) Patent No.: US 7,409,155 B2
(45) Date of Patent: Aug. 5, 2008

(54) OPTICAL TRANSMISSION SYSTEM

(75) Inventor: Tsukasa Takahashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 10/808,606

(22) Filed: Mar. 25, 2004

(65) Prior Publication Data
US 2005/0041968 A1    Feb. 24, 2005

(30) Foreign Application Priority Data
Aug. 21, 2003    (JP)    ............... 2003-297432

(51) Int. Cl.
*H04B 10/08* (2006.01)
(52) U.S. Cl. .......................... 398/30; 398/10
(58) Field of Classification Search .................. 398/10, 398/14, 15, 30, 37, 68, 155, 181; 359/154, 359/179
See application file for complete search history.

(56) References Cited

U.S. PATENT DOCUMENTS

| | | | |
|---|---|---|---|
| 6,292,289 B1 | 9/2001 | Sugaya et al. | |
| 6,411,407 B1 * | 6/2002 | Maxham | ...................... 398/173 |
| 6,619,867 B1 * | 9/2003 | Asahi | .......................... 398/154 |
| 6,941,078 B1 * | 9/2005 | Onaka | ......................... 398/155 |
| 7,039,325 B2 * | 5/2006 | Sekiya et al. | ................ 398/181 |
| 2002/0024690 A1 * | 2/2002 | Iwaki et al. | .................. 359/110 |
| 2002/0114060 A1 * | 8/2002 | Kobayashi et al. | .......... 359/334 |
| 2003/0223751 A1 * | 12/2003 | Shimizu et al. | ............... 398/79 |
| 2004/0208519 A1 * | 10/2004 | Feldman et al. | ............... 398/30 |

* cited by examiner

*Primary Examiner*—Richard Hjerpe
*Assistant Examiner*—Shaheda A Abdin
(74) *Attorney, Agent, or Firm*—Staas & Halsey LLP (57) ABSTRACT

In an optical transmission system: a first unit generates a first optical supervisory signal being arranged on the shorter-wavelength side of main signals and containing information for determining continuity of an optical transmission line and a second optical supervisory signal arranged on the longer-wavelength side of the main signals and used for supervisory control of optical communication; a second unit generates a wavelength-multiplexed signal by optically multiplexing the main signals and the first and second optical supervisory signals, and transmits the wavelength-multiplexed signal onto the optical transmission line; a third unit receives the wavelength-multiplexed signal, and optically demultiplexes the wavelength-multiplexed signal into the main signals and the first and second optical supervisory signals; and a fourth unit determines whether or not the optical transmission line is optically continuous, based on the first optical supervisory signal, and performs supervisory control of optical communication based on the second optical supervisory signal.

2 Claims, 8 Drawing Sheets

OPTICAL TRANSMISSION SYSTEM

BACKGROUND OF THE INVENTION

1) Field of the Invention

The present invention relates to an optical transmission system. In particular, the present invention relates to an optical transmission system which performs WDM (Wavelength Division Multiplex) transmission of optical signals.

2) Description of the Related Art

The WDM technology is a widely used, core technology for optical transmission systems. According to WDM, signals in a plurality of channels are concurrently transmitted through a single optical fiber by multiplexing light having different wavelengths. In WDM systems, optical supervisory signals having a bandwidth of about 1.5 to 150 Mb/s and being called OSC (Optical Supervisory Channel) signals are transmitted as well as main signals having a bandwidth of 2.4 to 40 Gb/s.

The OSC signals are optical signals used for detection of troubles in transmission lines as well as condition monitoring and setting for administration, e.g., condition monitoring and setting control of optical amplifiers. Therefore, normally, in the WDM systems, only the main signals are amplified by optical amplifiers (e.g., erbium-doped-fiber amplifiers, which are hereinafter referred to as EDFAs) for transmission, and the OSC signals are transmitted without being amplified through the optical amplifiers. In addition since the OSC signals are used as control signals, the transmission levels of the OSC signals are set at low levels so as not to interfere with the main signals.

On the other hand, repeaterless optical transmission systems are currently receiving attention. Since no repeaters are placed in the transmission lines in the repeaterless optical transmission systems, the construction cost can be reduced, and low-price services are enabled. Therefore, demands for construction of reliable repeaterless optical transmission systems are increasing.

In the conventional repeaterless optical transmission systems, some attempts to increase the transmission distance have been made by raising the transmission level of each optical amplifier provided on the upstream side, or providing a Raman amplifier on the downstream side of each optical-fiber transmission line and injecting strong excitation light into the entire length of each optical-fiber transmission line.

However, since the OSC signals are concerned in the overall control of each system, the OSC signals are required to be transmitted between terminal stations regardless of operations of the optical amplifier in the terminal station on the upstream side or the Raman amplifier in the terminal station on the downstream side, e.g., even when the optical amplifier on the upstream side or the Raman amplifier on the downstream side is not in operation.

That is, in the case where transmission is performed over a long distance in a repeaterless optical transmission system, and main signals are amplified with a gain sufficient for transmission of the main signals over the long distance, the OSC signals are required to be normally transmitted between terminal stations and received by the terminal stations even when the OSC signals are not amplified with the same gain as the main signals. Since it is impossible to raise the transmission levels of the OSC signals more than +10 dBm above levels at which an anti-hazard measure becomes necessary, or lower the reception levels in an O/E (opto-electric conversion) module provided on the receiver side below a minimum reception level, conventionally, long-distance transmission of the OSC signals is difficult.

A technique for preventing deterioration of OSC signals during transmission has been proposed, for example, as disclosed in Japanese Unexamined Patent Publication No. 2000-269902, paragraph Nos. 0033 to 0046 and FIG. 4. According to this technique, the OSC signals are processed by using an optical amplifier having satisfactory noise characteristics and gain efficiency.

In the case where the transmission line is a single mode fiber (SMF), and wavelengths on the shorter-wavelength side of main signals (e.g., around the wavelength of 1,510 nm) are allocated to OSC signals, loss in the OSC signals is great, and therefore it is impossible to increase the transmission distance. Thus, conventionally, systems in which wavelengths around 1,510 nm (located on the shorter-wavelength side of main signals) are allocated to OSC signals have been used in only configurations in which the transmission distance is short, or repeaters are arranged at short intervals.

On the other hand, in the conventional repeaterless optical transmission systems, normally, wavelengths on the longer-wavelength side of the main signals (e.g., wavelengths around 1,625 nm) are allocated to OSC signals. This is because the transmission loss through SMFs are small at the wavelengths around 1,625 nm, and the OSC signals are amplified by stimulated Raman scattering (SRS) by the main signals when the wavelengths on the longer-wavelength side of the main signals (e.g., wavelengths around 1,625 nm) are allocated to the OSC signals. Thus, it is possible to increase the transmission distance of the OSC signals. The SRS is a nonlinear optical phenomenon in which light having a shorter wavelength amplifies light having a longer wavelength.

However, when the gain levels of the main signals vary due to some cause in the above case, the gains in the Raman amplification of the OSC signals also vary, i.e., the optical power levels of the OSC signals also vary. Therefore, in this case, an error is detected by an OSC receiver unit provided in a receiver. In this case, even when no trouble actually occurs in the transmission line, the receiver may recognize that an abnormal condition has occurred in the transmission line.

Incidentally, in repeaterless optical transmission systems, the output power of optical amplifiers provided on the transmitter side is as high as at least 1. W, and the output power of Raman excitation light supplied from the receiver side is as high as at least 1 to 2 W. Therefore, if the optical fiber breaks, and light leaks out, it is very dangerous.

In consideration of the above danger, a function called APSD (Auto Power Shut Down) is provided in the conventional repeaterless optical transmission systems. When a trouble such as a failure in an optical fiber occurs, the APSD function automatically stops the Raman excitation light source and the optical amplifier which outputs the high-power optical signals, and shuts off light emission to the outside of each repeaterless optical transmission system, for the purpose of human body protection and fire prevention.

Conventionally, the APSD function is activated when an error is detected in an OSC signal. That is, when an error in a downstream OSC signal is detected by an apparatus on the downstream side, the apparatus stops the optical output of Raman excitation light from the apparatus, and transmits through an upstream line an OSC signal for a notification of the error. When an apparatus on the upstream side receives the notification of the error, the apparatus on the upstream side stops the output of an optical amplifier in the apparatus on the upstream side.

However, since wavelengths on the longer-wavelength side of the main signals are allocated to the OSC signals in the conventional repeaterless optical transmission systems in which the APSD function is activated in response to detection of an error, the levels of OSC signals are affected by variations in the main signals. Therefore, there is a possibility that the apparatus on the downstream side detects an error even when a failure in an optical fiber does not actually occur, and the APSD function is activated by error when optical communication is normally performed.

Further, according to the conventional technique disclosed in Japanese Unexamined Patent Publication No. 2000-269902, the OSC signals are processed by arranging an optical repeater in a transmission line, and choosing an optical amplifier having satisfactory characteristics in the repeater. Since this technique uses an optical repeater, this technique cannot be applied to the repeaterless optical transmission systems.

SUMMARY OF THE INVENTION

The present invention is made in view of the above problems, and the object of the present invention is to provide an optical transmission system which enables high-quality long-distance optical transmission, and prevents inappropriate operations at the time of detection of an error in an OSC signal.

In order to accomplish the above object, an optical transmission system for performing WDM optical transmission is provided. The optical transmission system includes an optical transmission device and an optical reception device. The optical transmission device includes: an optical-supervisory-signal generation unit which generates a first optical supervisory signal being arranged on a shorter-wavelength side of main signals and containing information for use in determination of continuity of an optical transmission line and a second optical supervisory signal arranged on a longer-wavelength side of the main signals and used for supervisory control of optical communication; and an optical multiplexing unit which generates a wavelength-multiplexed signal by optically multiplexing the main signals and the first and second optical supervisory signals, and transmits the wavelength-multiplexed signal onto the optical transmission line. In addition, the optical reception device includes: an optical demultiplexing unit which receives the wavelength-multiplexed signal, and optically demultiplexes the wavelength-multiplexed signal into the main signals, the first optical supervisory signal, and the second optical supervisory signal; and an optical-supervisory-signal reception unit which determines whether or not the optical transmission line is optically continuous, based on the first optical supervisory signal, and performs supervisory control of optical communication based on the second optical supervisory signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention are explained below with reference to drawings.

Figure 1:
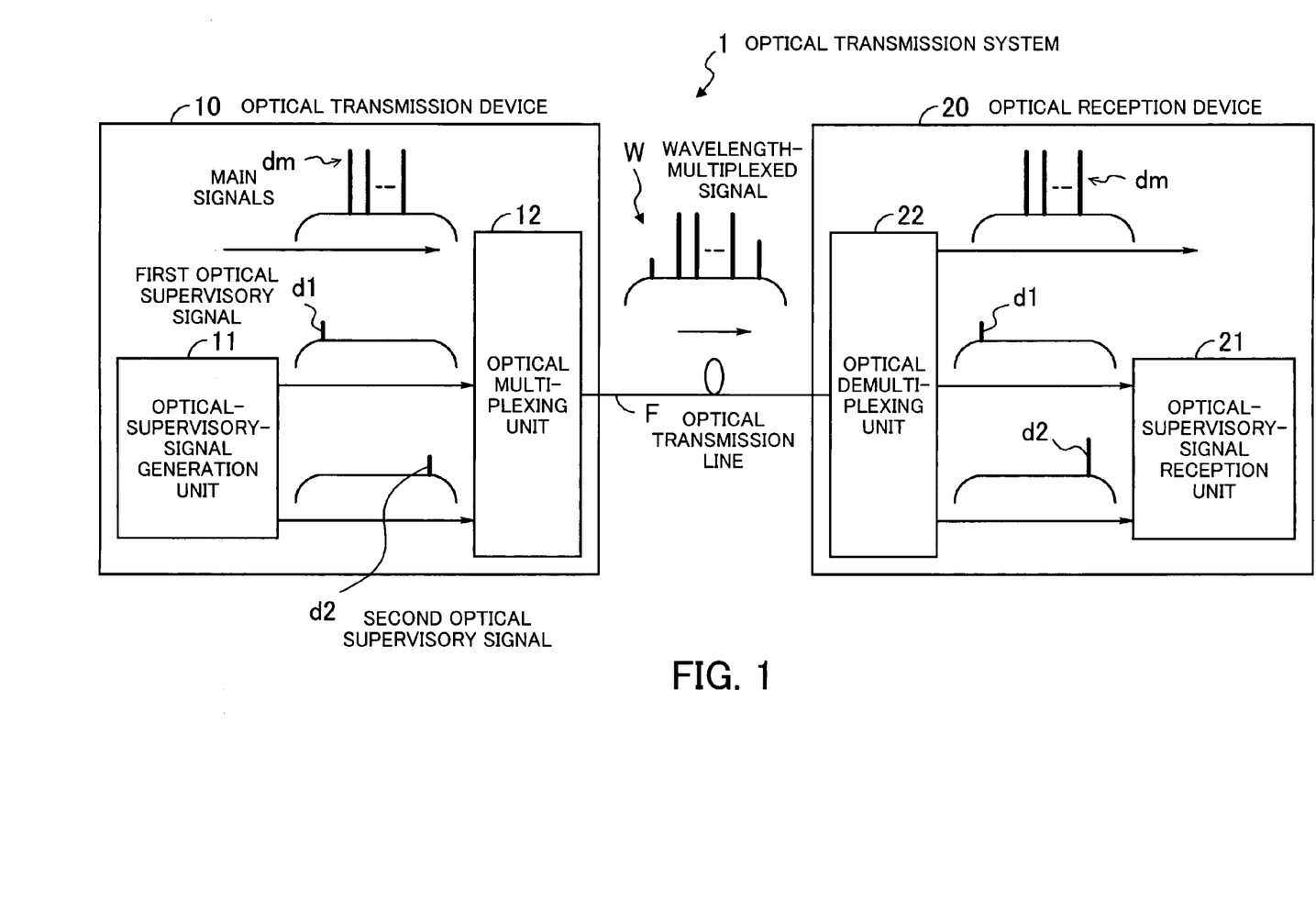
FIG. 1 is a diagram illustrating the principle of an optical transmission system according to the present invention.

FIG. 1 is a diagram illustrating the principle of an optical transmission system according to the present invention. The optical transmission system 1 according to the present invention is a system for performing WDM optical transmission, and includes an optical transmission device 10 and an optical reception device 20. Although only a construction for optical transmission in a downstream direction is illustrated in FIG. 1, it is preferable that the optical transmission device 10 also has the functions of the optical reception device 20 and vice versa.

The optical transmission device 10 includes an optical-supervisory-signal generation unit 11 (hereinafter referred to as an OSC generation unit) and an optical multiplexing unit 12. The OSC generation unit 11 generates a first optical supervisory signal (hereinafter referred to as a first OSC signal d1) containing transmission-line continuity information (information for use in determination of continuity of the optical transmission line F) and a second optical supervisory signal (hereinafter referred to as a second OSC signal d2) used for supervisory control of optical communication. A wavelength on the shorter-wavelength side of main signals dm is allocated to the first OSC signal d1, and a wavelength on the longer-wavelength side of the main signals dm is allocated to the second OSC signal d2. The optical multiplexing unit 12 generates a wavelength-multiplexed signal W by optically multiplexing the main signals dm and the first and second OSC signals d1 and d2, and transmits the wavelength-multiplexed signal W onto the optical transmission line F.

The optical reception device 20 includes an optical-supervisory-signal reception unit 21 (hereinafter referred to as an OSC reception unit) and an optical demultiplexing unit 22. The optical demultiplexing unit 22 receives the wavelength-multiplexed signal W, and optically demultiplexes the wavelength-multiplexed signal W into the main signals dm, the first OSC signal d1, and the second OSC signal d2. The OSC reception unit 21 determines whether or not the optical transmission line F is optically continuous, based on the first OSC signal d1, and performs supervisory control of optical communication based on the second OSC signal d2.

Figure 2:
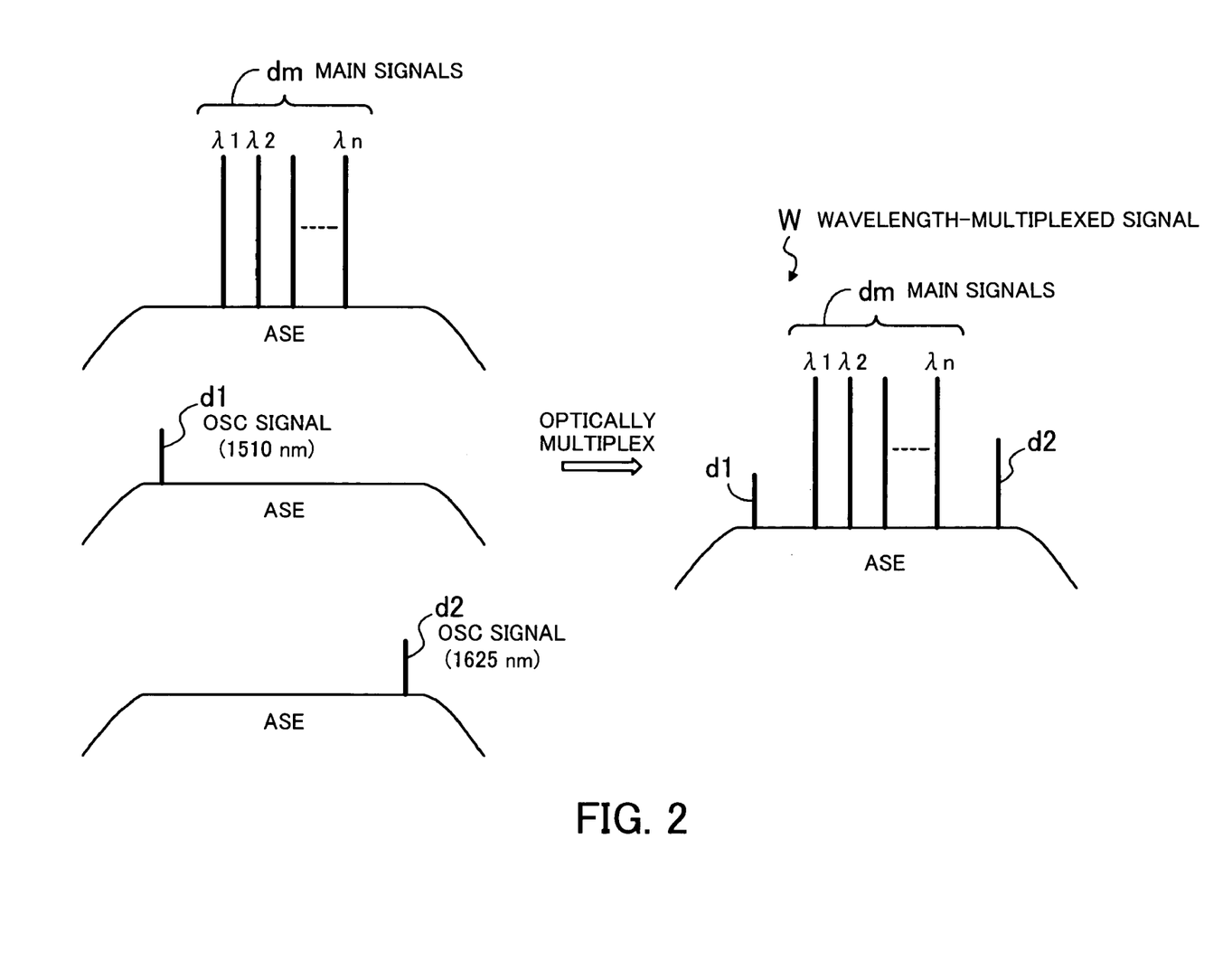
FIG. 2 is a diagram indicating relationships between wavelengths of optically multiplexed optical signals.

Next, wavelength allocation to the first and second OSC signals d1 and d2 is explained below. FIG. 2 is a diagram indicating relationships between the wavelengths of the optically multiplexed optical signals. Each of the main signals dm having wavelengths λ1 to λn, the first OSC signal d1, and the second OSC signal d2 includes a component of amplified spontaneous emission (ASE) and an optical signal component. The component of amplified spontaneous emission is a noise component produced by spontaneous emission.

As mentioned before, a wavelength on the shorter-wavelength side of the main signals dm (e.g., a wavelength around 1,510 nm) is allocated to the first OSC signal d1, another wavelength on the longer-wavelength side of the main signals dm (e.g., a wavelength around 1,625 nm) is allocated to the second OSC signal d2, and the wavelength-multiplexed signal W to be transmitted is generated by optically multiplexing the main signals dm, the first OSC signal d1, and the second OSC signal d2.

Since the second OSC signal d2 is amplified due to the effect of SRS by the main signals dm, the level of the first OSC signal d1 becomes higher than the level of the second OSC signal d2.

Figure 3:
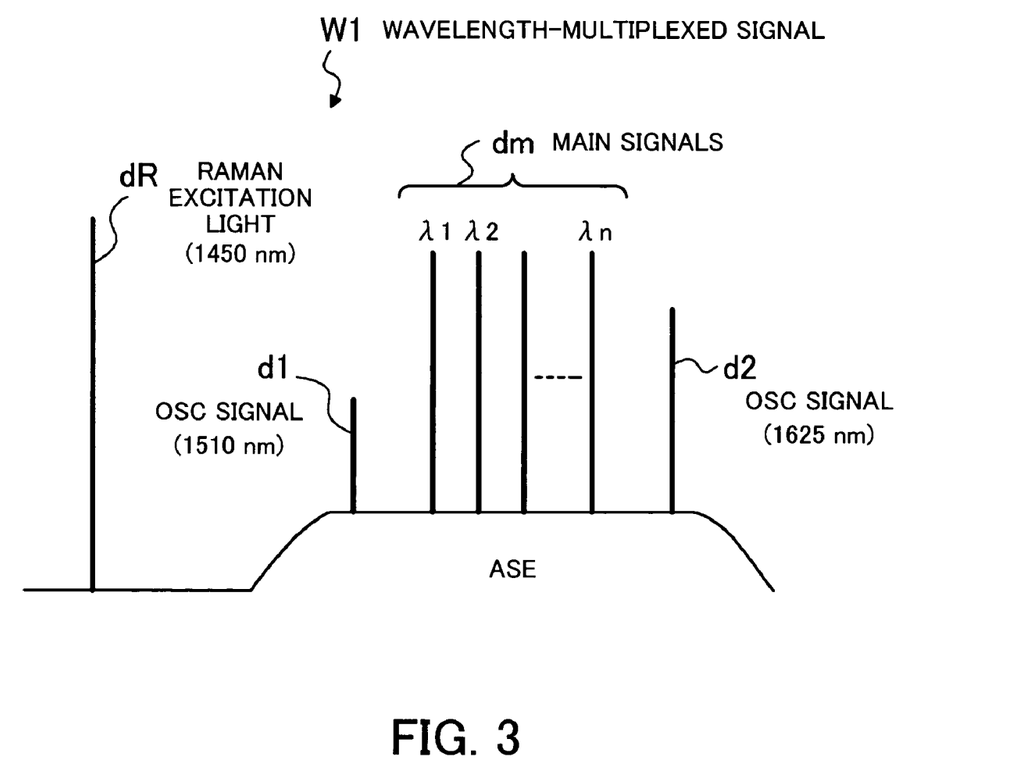
FIG. 3 is a diagram indicating relationships between wavelengths of optical signals transmitted through the optical transmission line and Raman excitation light injected into an optical transmission line.

FIG. 3 is a diagram indicating relationships between the wavelengths of the optical signals transmitted through the optical transmission line and Raman excitation light injected into the optical transmission line. In FIG. 3, spectrum allocation to a wavelength-multiplexed signal W1 is indicated together with Raman excitation light dR injected into the optical transmission line for Raman amplification. The gain peak of the Raman scattering is shifted from the wavelength of incident excitation light toward the longer-wavelength side by about 100 nm. That is, the incident excitation light amplifies an optical signal at the wavelength shifted from the wavelength of the incident excitation light toward the longer-wavelength side by about 100 nm. Therefore, for example, in order to amplify an optical signal at the wavelength of 1,550 nm, excitation light dR at the wavelength around 1,450 nm should be injected into the optical-fiber transmission line.

In the case where the Raman amplification is used in WDM systems, normally a plurality of excitation wavelengths are used in order to expand the gain bandwidth for amplifying main signals distributed over a broad bandwidth. However, for simplicity of illustration, Raman excitation light having only one wavelength is indicated in FIG. 1.

In addition, since the Raman amplification is performed on the wavelength-multiplexed signal W1, signal levels of the main signals dm and the first and second OSC signals d1 and d2 in the wavelength-multiplexed signal W1 become higher than the signal levels indicated in FIG. 2.

Hereinbelow, the characteristic features of the present invention that wavelengths on both sides of the wavelengths of the main signals dm are allocated to the first and second OSC signals d1 and d2 are explained in detail in connection with the problems to be solved by the present invention.

Generally, it is possible to transmit OSC signals to which wavelengths on the shorter-wavelength side of the wavelengths of main signals are allocated, without influence of SRS by the main signals, which have high signal power. Therefore, even when a sudden level change occurs in the main signals, variations in the levels of the OSC signals are small on the receiver side.

However, the SMFs used in the normal optical-fiber transmission have a fiber characteristic that transmission loss is great in a wavelength band (e.g., around 1,510 nm) located on the shorter-wavelength side of the wavelengths of main signals. Therefore, when wavelengths on the shorter-wavelength side of the wavelengths of the main signals are allocated to the OSC light, the loss in the OSC light significantly increases as the fiber distance increases. Thus, it is not appropriate to allocate wavelengths on the shorter-wavelength side of the wavelengths of the main signals to the OSC signals for long-distance transmission.

On the other hand, the loss caused by transmission through an SMF is small at the wavelength range around 1,625 nm. In addition, when OSC light has a wavelength in this wavelength range, the OSC light is amplified due to the effect of SRS by the main signals. Therefore, conventionally, in order to perform long-distance transmission, wavelengths on the longer-wavelength side of the wavelengths of main signals are allocated to the OSC light.

Nevertheless, the amplification utilizing the SRS effect has the following disadvantages.

When the levels of main signals suddenly vary or the transmission levels of the main signals suddenly droop, the variation or droop of the main signals directly cause level variations in OSC signals to which wavelengths on the longer-wavelength side of the wavelengths of the main signals are allocated. Then, the level variations in the OSC signals are detected by receivers as errors in the OSC signals, and the receivers recognize each error as occurrence of a failure in a transmission line even when no failure has actually occurred in the transmission line.

Further, when a failure in an optical fiber occurs in a system handling high output power, an APSD function, which is a function of automatic stop control of a high-output-power amplifier, is activated for human body protection. Conventionally, when OSC light becomes unable to be normally received by a receiver, i.e., when the receiver detects an error in the OSC light, the receiver activates an APSD function based on an understanding that a failure in an optical fiber occurs.

However, since wavelengths on the longer-wavelength side of the wavelengths of main signals are allocated to OSC light in the conventional repeaterless optical transmission systems handling high output power, there is a possibility that variations in the levels of the main signals cause variations in the level of the OSC light even when no failure occurs in the optical fiber. That is, receivers can activate APSD functions so as to shut down amplifier systems including, for example, EDFAs and Raman excitation units, and stop system operations even when no failure occurs in optical fibers.

In consideration of the above advantages and disadvantages of the wavelengths allocated to OSC signals and the APSD function, according to the present invention, the two OSC signals d1 and d2 are arranged on both of the shorter- and longer-wavelength sides of the main signals dm, and are respectively used for different purposes.

First, according to the present invention, the first OSC signal d1 is not used as the conventional OSC signal for administration and supervision, and contains only clock information having simple data and bit representations, e.g., alternating zeros and ones represented by the NRZ (Non-Return-to-Zero) code. The optical reception device 20 extracts only the clock component from the first OSC signal d1. When the clock component cannot be extracted from the first OSC signal d1, the optical reception device 20 determines that an abnormal condition has occurred in the transmission line. On the other hand, when the clock component can be extracted from the first OSC signal d1, the optical reception device 20 determines that the transmission line is normal.

Although OSC signals on the shorter-wavelength side are not suitable for long-distance transmission, the first OSC signal d1 according to the present invention contains only the clock information, which is a high-frequency component, and the optical reception device 20 extracts the clock component. In this case, even when the input level of the first OSC signal d1 drops by about 5 to 10 dB, the optical reception device 20 can easily extract the clock component since the clock component is a high-frequency component. That is, even when the transmission level is low, transmission of the first OSC signal d1 (clock information) between the optical transmission device 10 and the optical reception device 20 can be stably performed.

In addition, the second OSC signal d2 on the longer-wavelength side contains control information for administration and supervision of the system, which is similar to the control information contained in the OSC signals normally used in the conventional WDM systems. Thus, the optical transmission device 10 and the optical reception device 20 perform administration and supervision control based on the second OSC signal d2.

Further, an APSD function is activated when the optical reception device 20 cannot extract the clock component from the first OSC signal d1. Therefore, even when the level of the second OSC signal d2 varies with variations in the main signals dm, and an error occurs in the second OSC signal d2, the APSD function is not activated (i.e., the optical reception device 20 does not determine that a fiber failure has occurred) as long as the clock component can be extracted from the first OSC signal d1. Only when the optical reception device 20 cannot extract the clock component from the first OSC signal d1, the optical reception device 20 determines that a fiber failure has occurred, and activates the APSD function.

As explained above, according to the present invention, transmission is performed in such a manner that a wavelength on the shorter-wavelength side of the main signals dm is allocated to the first OSC signal d1 containing the clock information, and another wavelength on the longer-wavelength side of the main signals dm is allocated to the second OSC signal d2 for supervisory control. Only when the optical reception device 20 cannot extract the clock component from the first OSC signal d1, the optical reception device 20 activates the APSD function.

Thus, even in the case of long-distance transmission, it is possible to transmit and receive control information with the second OSC signal d2. In addition, even when the level of the second OSC signal d2 varies with variations in the main signals dm, and an error occurs in the second OSC signal d2, the optical reception device 20 does not determine that a fiber failure has occurred, as long as the clock component can be extracted from the first OSC signal d1. Therefore, it is possible to prevent inappropriate activation of the APSD function.

When the level of the second OSC signal d2 varies with variations in the main signals dm, and an error occurs in the second OSC signal d2, and the optical reception device 20 can extract the clock component from the first OSC signal d1, the state of control by use of the OSC signals before the variation in the level of the second OSC signal d2 is maintained even after the occurrence of the error in the second OSC signal d2 except that the operator is notified of the occurrence of the error. At this time, optical transmission of the main signals dm is continued without a hitch.

Next, examples of constructions of the optical transmission system 1 are explained below.

Figure 4:
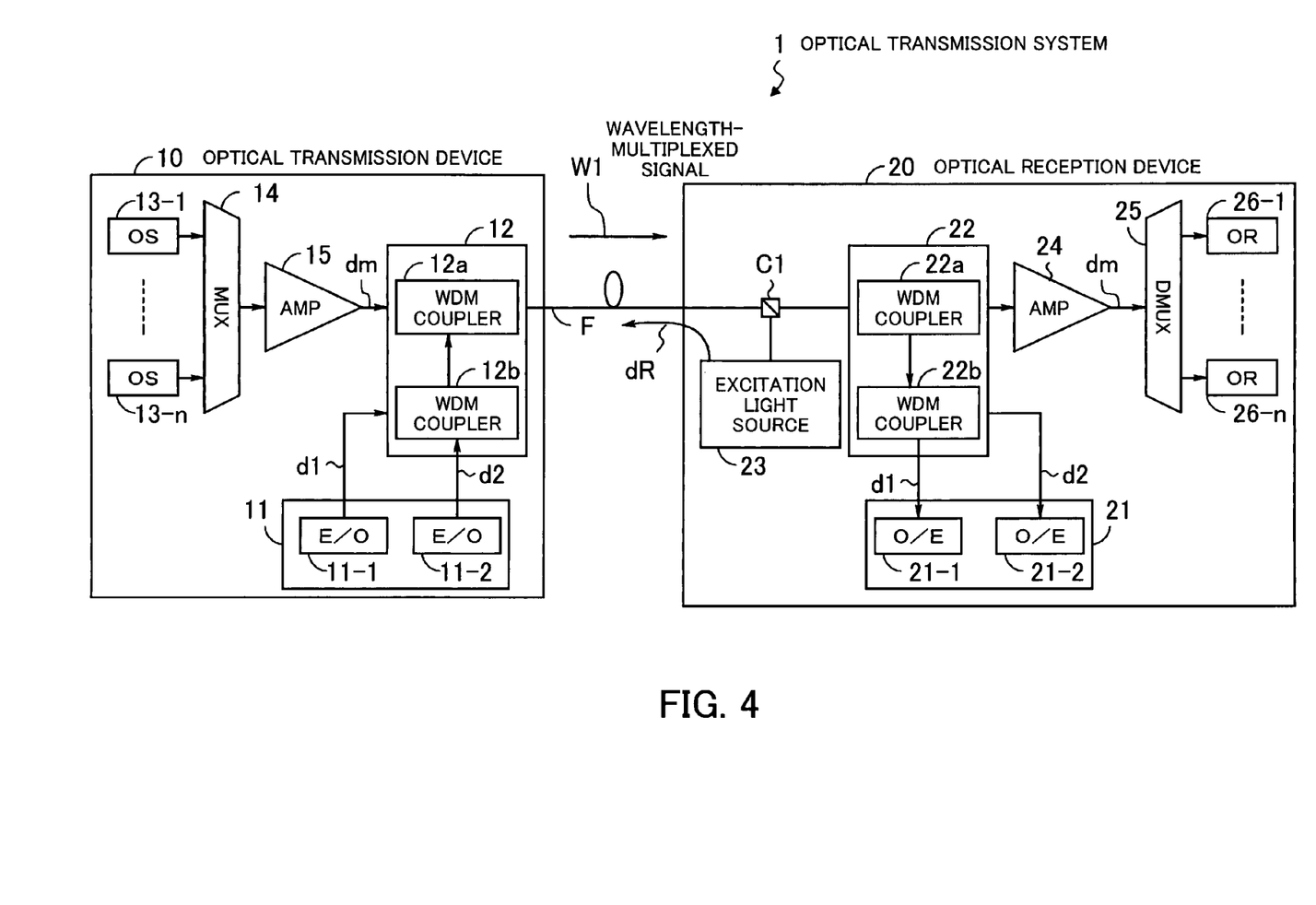
FIG. 4 is a diagram illustrating a first example of the construction of the optical transmission system according to the present invention.

FIG. 4 is a diagram illustrating a first example of the construction of the optical transmission system according to the present invention. The optical transmission system 1 of FIG. 4 includes an optical transmission device 10 and an optical reception device 20. The optical transmission device 10 includes an OSC generation unit 11, an optical multiplexing unit 12, optical transmitter units (OS) 13-1 to 13-n, a multiplexer (MUX) 14, and an optical amplifier 15. The OSC generation unit 11 contains electro-optic conversion (E/O) units 11-1 and 11-2, and the optical multiplexing unit 12 contains WDM couplers 12a and 12b.

The optical reception device 20 includes an OSC reception unit 21, an optical demultiplexing unit 22, an excitation light source 23, a coupler C1, an optical amplifier 24, a demultiplexer (DMUX) 25, and optical receiver units (OR) 26-1 to 26-n. The OSC reception unit 21 contains opto-electric conversion (O/E) units 21-1 and 21-2, and the optical demultiplexing unit 22 contains WDM couplers 22a and 22b.

Operations of the construction of FIG. 4 are explained below.

In the optical transmission device 10, the optical transmitter units 13-1 to 13-n output main signals having wavelengths $\lambda 1$ to $\lambda n$, respectively. The multiplexer 14 multiplexes the main signals having wavelengths $\lambda 1$ to $\lambda n$, and the optical amplifier 15 amplifies the multiplexed main signals, and outputs the amplified, multiplexed main signals as the main signals dm.

The E/O unit 11-1 generates the first OSC signal d1 by converting a first electric signal representing clock information into an optical signal, for example, in a 1,510 nm band, and the E/O unit 11-2 generates the first OSC signal d2 by converting a second electric signal representing control information into an optical signal, for example, in a 1,625 nm band.

The WDM coupler 12b optically multiplexes the OSC signals d1 and d2, and the WDM coupler 12a optically multiplexes the main signals dm and the output signal from the WDM coupler 12b so as to generate the wavelength-multiplexed signal W1, and transmits the wavelength-multiplexed signal W1 onto the optical transmission line F. As illustrated in FIG. 3, in the spectrum of the wavelength-multiplexed signal W1, the first OSC signal d1 is located on the shorter-wavelength side of the main signals dm, the second OSC signal d2 is located on the longer-wavelength side of the main signals dm, and Raman excitation light dR is located on the shorter-wavelength side of the first OSC signal d1.

In the optical reception device 20, the excitation light source 23 emits the Raman excitation light dR through the coupler C1 onto the optical transmission line F for backward Raman amplification. When the WDM coupler 22a receives the wavelength-multiplexed signal W1, the WDM coupler 22a optically demultiplexes the wavelength-multiplexed signal W1 into the main signals dm, the first OSC signal d1, and the second OSC signal d2, and passes the main signals dm to the optical amplifier 24 and the OSC signals d1 and d2 to the WDM coupler 22b.

The optical amplifier 24 amplifies the main signals dm, and the demultiplexer 25 demultiplexes (performs wavelength separation of) the amplified main signals dm into signals having the wavelengths $\lambda 1$ to $\lambda n$, and passes the signals having the wavelengths $\lambda 1$ to $\lambda n$ to the optical receiver units 26-1 to 26-n, which perform reception processing of the signals having the wavelengths $\lambda 1$ to $\lambda n$, respectively.

The WDM coupler 22b optically demultiplexes the signals which are passed by the WDM coupler 22a to the WDM coupler 22b, into the OSC signals d1 and d2, and passes the first OSC signal d1 to the O/E unit 21-1 and the second OSC signal d2 to the O/E unit 21-2. The O/E unit 21-1 converts the first OSC signal d1 into the first electric signal, and performs processing for extracting the clock component from the first electric signal. The O/E unit 21-2 converts the second OSC signal d2 into a second electric signal, and performs processing for controlling the administration and supervision of the system based on the second electric signal.

Figure 5:
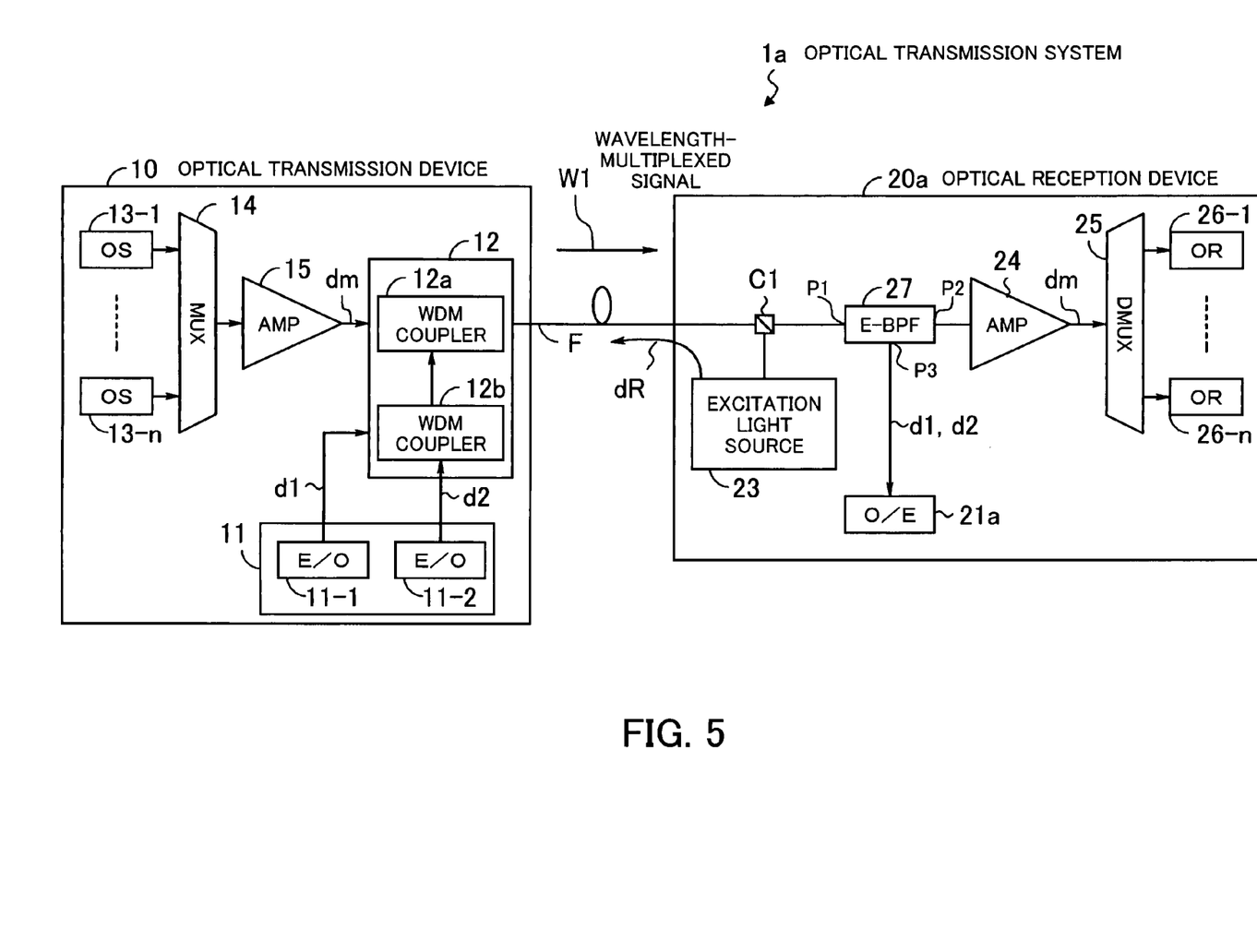
FIG. 5 is a diagram illustrating a second example of the construction of the optical transmission system according to the present invention.

Next, another construction of the optical transmission system is explained below. FIG. 5 is a diagram illustrating a second example of the construction of the optical transmission system according to the present invention. The optical transmission system 1a of FIG. 5 includes an optical transmission device 10 and an optical reception device 20a. Since the optical transmission system 1a of FIG. 5 is different from the optical transmission system 1 of FIG. 4 in only the optical reception device 20a, the construction and operations of only the optical reception device 20a are explained below.

The optical reception device 20a includes an OSC reception (O/E) unit 21a, an excitation light source 23, a coupler C1, an optical amplifier 24, a demultiplexer (DMUX) 25, optical receiver units (OR) 26-1 to 26-n, and an eliminate band pass filter (E-BPF) 27. The E-BPF 27 in the construction of FIG. 5 is provided instead of the optical demultiplexing unit 22 in the construction of FIG. 4.

The excitation light source 23 emits Raman excitation light dR through the coupler C1 onto the optical transmission line F for backward Raman amplification. The E-BPF 27 allows optical signals being inputted from the port P1 and having wavelengths in the wavelength range for the main signals dm outgo through the port P2, and passes the optical signals to the optical amplifier 24. In addition, the E-BPF 27 allows optical signals being inputted from the port P1 and having wavelengths in the other wavelength ranges (including the wavelength ranges for the OSC signals d1 and d2) outgo through the port P3, and passes to the O/E unit 21a the optical signals outputted through the port P3.

The optical amplifier 24 amplifies the main signals dm, and the demultiplexer 25 demultiplexes (performs wavelength separation of) the amplified main signals dm into signals having wavelengths λ1 to λn, and passes the signals having the wavelengths λ1 to λn to the optical receiver units 26-1 to 26-n, which perform reception processing of the signals having the wavelengths λ1 to λn. On the other hand, the O/E unit 21a converts the first OSC signal d1 into a first electric signal, performs processing for extracting the clock component from the first electric signal, converts the second OSC signal d2 into a second electric signal, and performs monitoring for administration and supervision based on the second electric signal.

Figure 6:
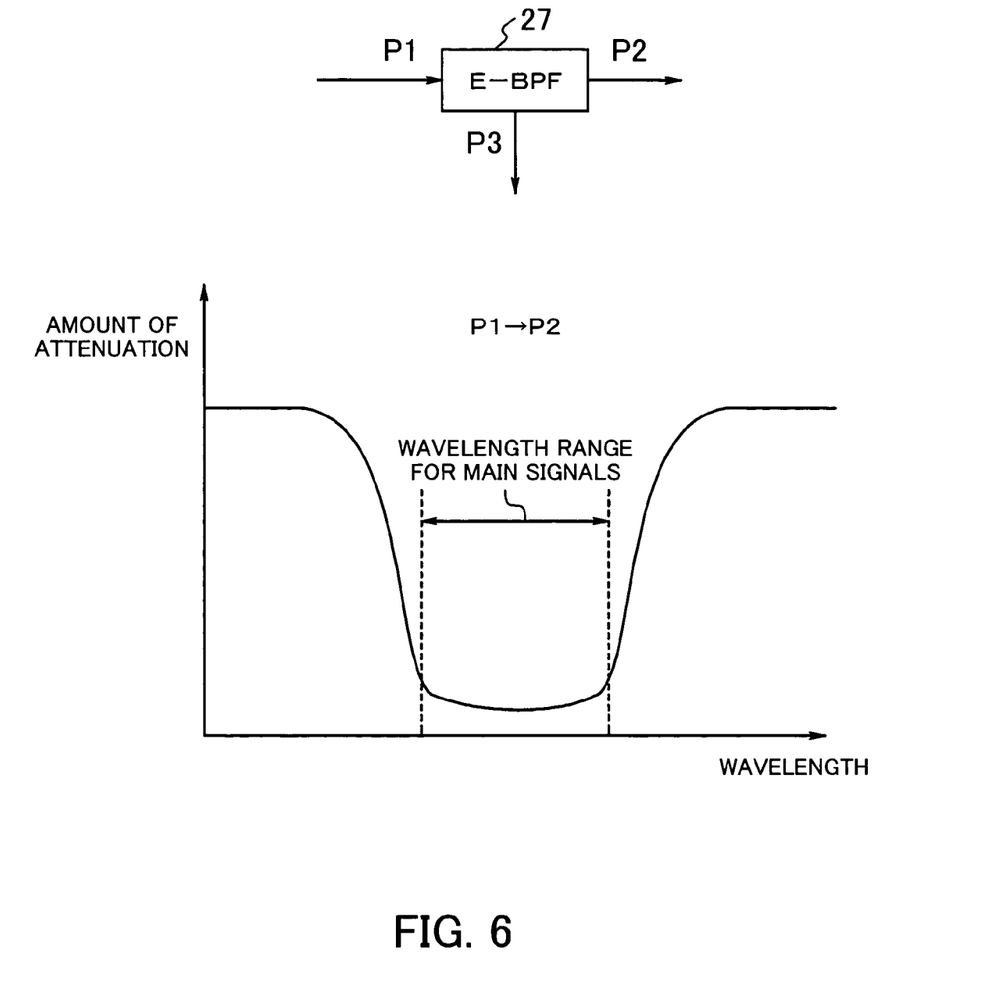
FIG. 6 is a diagram indicating a filter characteristic of an eliminate band pass filter.
Figure 7:
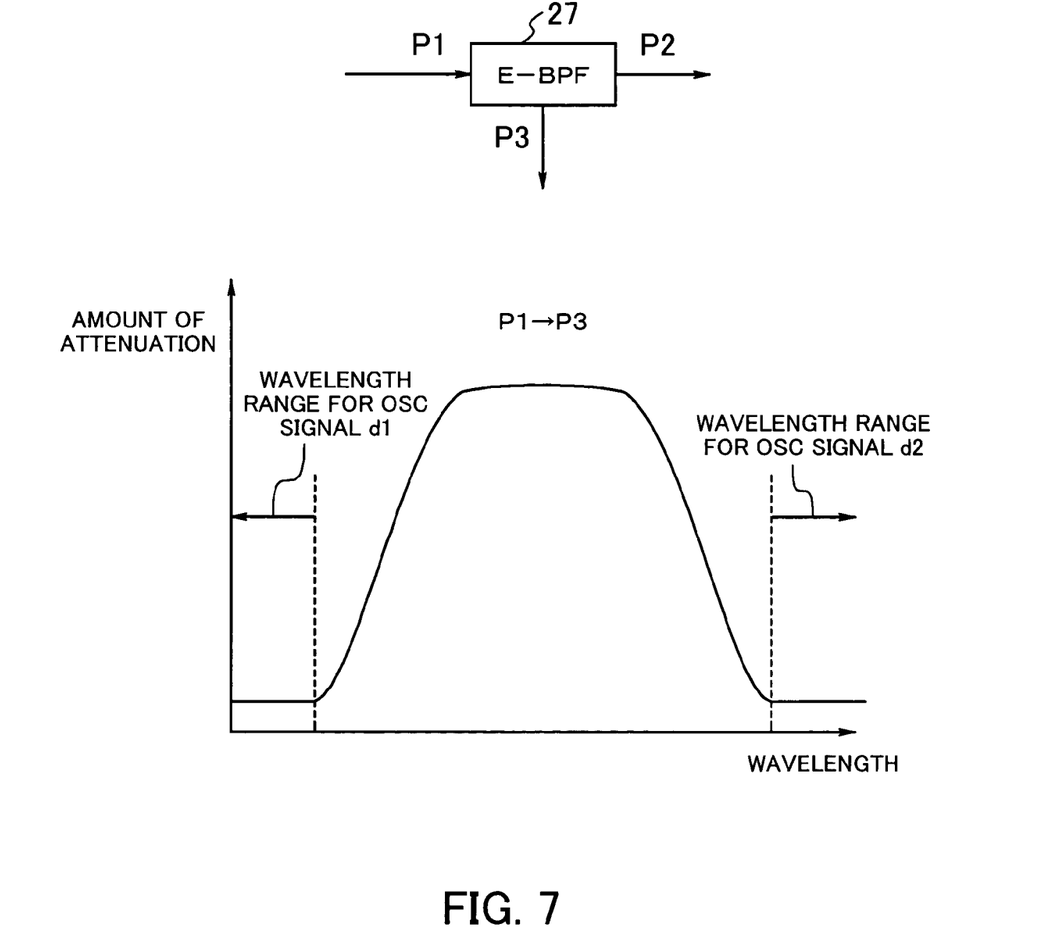
FIG. 7 is a diagram indicating a filter characteristic of the eliminate band pass filter.

FIGS. 6 and 7 are diagrams indicating filter characteristics of the eliminate band pass filter 27. In FIGS. 6 and 7, the ordinate of each of the graphs in FIGS. 6 and 7 indicates the amount of attenuation, and the abscissa indicates the wavelength.

FIG. 6 is a diagram indicating the filter characteristic of the path from the port P1 to the port P2 in the E-BPF 27. As illustrated in FIG. 6, the amount of attenuation is small in the wavelength range for the main signals, and great on both sides of the wavelength range for the main signals. That is, only optical signals in the wavelength range for the main signals can pass through the path from the port P1 to the port P2 in the E-BPF 27.

On the other hand, FIG. 7 is a diagram indicating the filter characteristic of the path from the port P1 to the port P3 in the E-BPF 27. As illustrated in FIG. 7, the amount of attenuation is great in the wavelength range for the main signals, and small on both sides of the wavelength range for the main signals. That is, only the OSC signals d1 and d2 in the wavelength ranges on both sides of the wavelength range for the main signals can pass through the path from the port P1 to the port P3 in the E-BPF 27.

Figure 8:
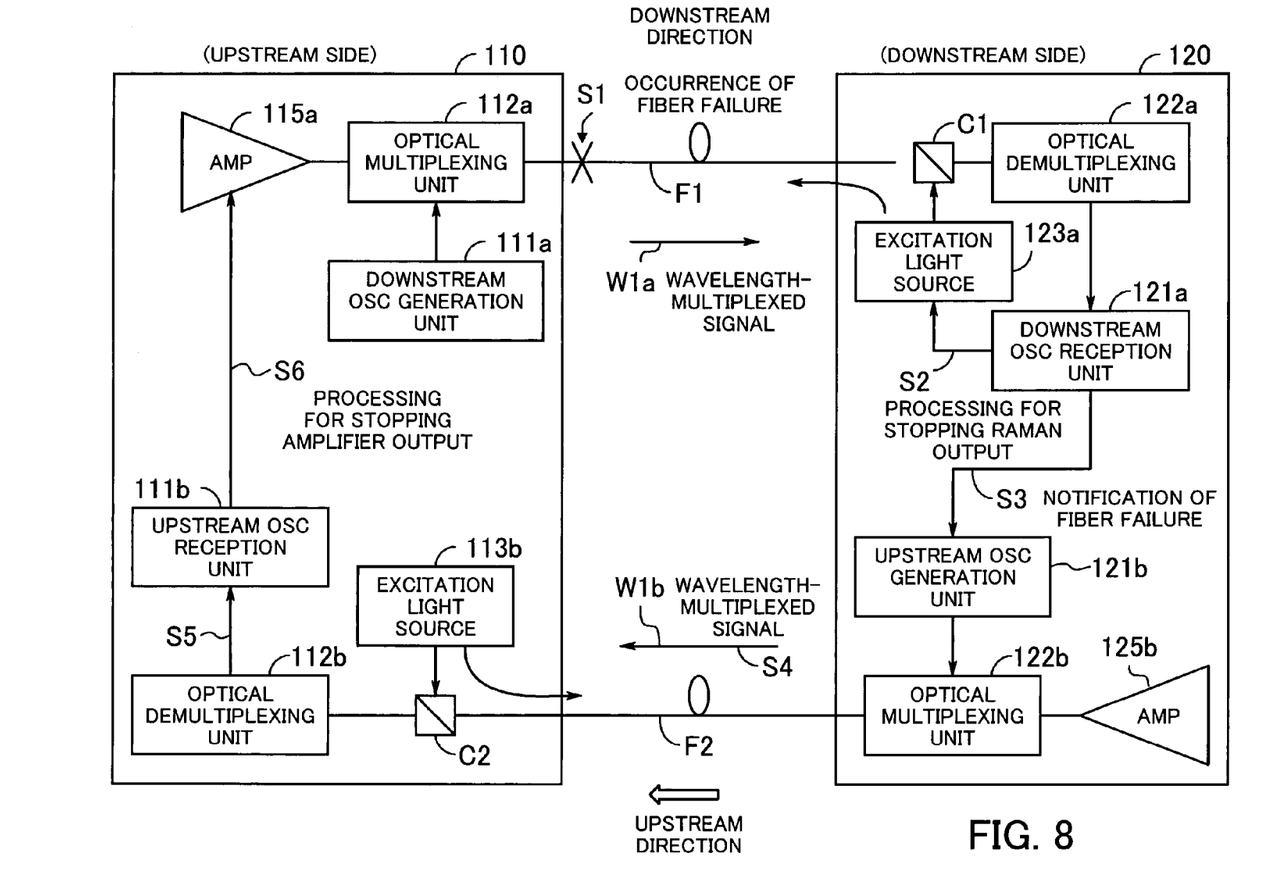
FIG. 8 is a diagram indicating a sequence of operations for activating an APSD function.

Next, a sequence of operations for activating the APSD function is explained below. FIG. 8 is a diagram indicating a sequence of operations for activating the APSD function when a failure occurs in an optical fiber F1 during communication between an optical transmission device 110 (on the upstream side) and another optical transmission device 120 (on the downstream side). In FIG. 8, only the elements which are concerned in the operations of the APSD function are indicated.

[S1] A failure occurs in the optical fiber F1 when a wavelength-multiplexed signal W1a is transmitted downstream from the optical transmission device 110 to the optical transmission device 120.

[S2} The downstream OSC reception unit 121a in the optical transmission device 120 receives a first OSC signal d1 passed from the optical demultiplexing unit 122a, detects a clock failure in the first OSC signal d1, and activates the APSD function based on an understanding that a fiber failure has occurred. Then, the downstream OSC reception unit 121a controls the excitation light source 123a so as to stop emission of Raman excitation light from the excitation light source 123a.

[S3] The downstream OSC reception unit 121a notifies the upstream OSC generation unit 121b that a failure has occurred in the optical fiber F1.

[S4] The upstream OSC generation unit 121b generates a second OSC signal d2 containing information on the abnormality in the downstream line, and passes the second OSC signal d2 to the optical multiplexing unit 122b together with a first OSC signal d1. The optical multiplexing unit 122b optically multiplexes the OSC signals d1 and d2 and main signals dm amplified by the optical amplifier 125b so as to generate a wavelength-multiplexed signal W1b, and transmits the wavelength-multiplexed signal W1b. During the transmission of the wavelength-multiplexed signal W1b, the excitation light source 113b emits Raman excitation light through the coupler C2 onto the optical fiber F2 for backward Raman amplification.

[S5] When the optical demultiplexing unit 112b receives the wavelength-multiplexed signal W1b, the optical demultiplexing unit 112b optically demultiplexes the wavelength-multiplexed signal W1b into the main signals dm and the OSC signals d1 and d2, and passes the OSC signals d1 and d2 to the upstream OSC reception unit 111b.

[S6] Based on the second OSC signal d2, the upstream OSC reception unit 111b recognizes that an abnormal condition has occurred in the downstream line. Then, the upstream OSC reception unit 111b performs processing for stopping output from the optical amplifier 115a. Thus, both of the excitation light source 123a and the optical amplifier 115a are shut down.

As explained above, in the optical transmission system according to the present invention, a first optical supervisory signal containing transmission-line continuity information, a second optical supervisory signal for supervisory control of optical communication, and main signals are transmitted from a transmitter in such a manner that the first optical supervisory signal is arranged on the shorter-wavelength side of the main signals, and the second optical supervisory signal is arranged on the longer-wavelength side of the main signals. The receiver determines whether or not the optical transmission line is optically continuous, based on the first optical supervisory signal, and performs supervisory control of optical communication based on the second optical supervisory signal. Thus, it is possible to prevent inappropriate operations at the time of detection of an error in an OSC signal, and perform high-quality long-distance transmission.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for performing WDM optical transmission, comprising an optical transmission device and an optical reception device;

wherein said optical transmission device includes, an optical-supervisory-signal generation unit which generates a first optical supervisory signal being arranged on a shorter-wavelength side of main signals and containing information for use in determination of continuity of an optical transmission line and a second optical supervisory signal arranged on a longer-wavelength side of the main signals and used for supervisory control of optical communication, and an optical multiplexing unit which generates a wavelength-multiplexed signal by optically multiplexing together simultaneously the main signals and the first and second optical supervisory signals, and transmits the wavelength-multiplexed signal onto said optical transmission line; and said optical reception device includes, an optical demultiplexing unit which receives said wavelength-multiplexed signal, and optically demultiplexes the wavelength-multiplexed signal into said main signals, said first optical supervisory signal, and said second optical supervisory signal, and an optical-supervisory-signal reception unit which determines whether or not said optical transmission line is optically continuous, based on the first optical supervisory signal, and performs supervisory control of optical communication based on the second optical supervisory signal, wherein said first optical supervisory signal generated by said optical-supervisory-signal generation unit contains clock information as said information for use in determination of continuity of said optical transmission line, and said optical-supervisory-signal reception unit activates an APSD (Auto Power Shut Down) function based on the clock information, wherein, even when the level of the second optical-supervisory-signal varies and an error occurs in the second optical-supervisory-signal, the APSD function is not activated as long as the clock information can be extracted from the first optical-supervisory-signal, and wherein, only when said optical-supervisory-signal reception unit cannot extract the clock information from the first optical-supervisory-signal, said optical-supervisory-signal reception unit determines that a fiber failure has occurred, and activates the APSD function.

2. An optical transmission device for performing WDM optical transmission, comprising:

an optical-supervisory-signal generation unit which generates a first optical supervisory signal being arranged on a shorter-wavelength side of first main signals and containing information for use in determination of continuity of a first optical transmission line and a second optical supervisory signal arranged on a longer-wavelength side of the first main signals and used for supervisory control of optical communication;

an optical multiplexing unit which generates a first wavelength-multiplexed signal by optically multiplexing together simultaneously the first main signals and the first and second optical supervisory signals, and transmits the first wavelength-multiplexed signal onto said first optical transmission line;

an optical demultiplexing unit which receives a second wavelength-multiplexed signal through a second optical transmission line, and optically demultiplexes the second wavelength-multiplexed signal into second main signals, a third optical supervisory signal, and a fourth optical supervisory signal, where the third optical supervisory signal is arranged on a shorter-wavelength side of the second main signals, and the fourth optical supervisory signal is arranged on a longer-wavelength side of the second main signals; and an optical-supervisory-signal reception unit which determines whether or not said second optical transmission line is optically continuous, based on the third optical supervisory signal, and performs supervisory control of optical communication based on the fourth optical supervisory signal, wherein said first optical supervisory signal generated by said optical-supervisory-signal generation unit contains clock information as said information for use in determination of continuity of said first optical transmission line, and said optical-supervisory-signal reception unit activates an APSD (Auto Power Shut Down) function based on the clock information, wherein, even when the level of the second optical-supervisory-signal varies and an error occurs in the second optical-supervisory-signal, the APSD function is not activated as long as the clock information can be extracted from the first optical-supervisory-signal, and wherein, only when said optical-supervisory-signal reception unit cannot extract the clock information from the first optical-supervisory-signal, said optical-supervisory-signal reception unit determines that a fiber failure has occurred, and activates the APSD function.

* * * * *